July 19, 1932.    M. A. ROLLMAN    1,867,953
ICE CREAM FREEZER
Filed May 20, 1931

Inventor
Michael A. Rollman
By Davis & Davis
Attorney

Patented July 19, 1932

1,867,953

UNITED STATES PATENT OFFICE

MICHAEL A. ROLLMAN, OF MOUNT JOY, PENNSYLVANIA, ASSIGNOR TO NEW STANDARD CORPORATION, OF MOUNT JOY, PENNSYLVANIA, A CORPORATION OF PENNSYLVANIA

ICE CREAM FREEZER

Application filed May 20, 1931. Serial No. 538,818.

The object of this invention is to provide a simple device for removably locking the gearing-bridge to the ice-tub, as more fully hereinafter set forth;

Referring to the drawing annexed,

Figure 1:
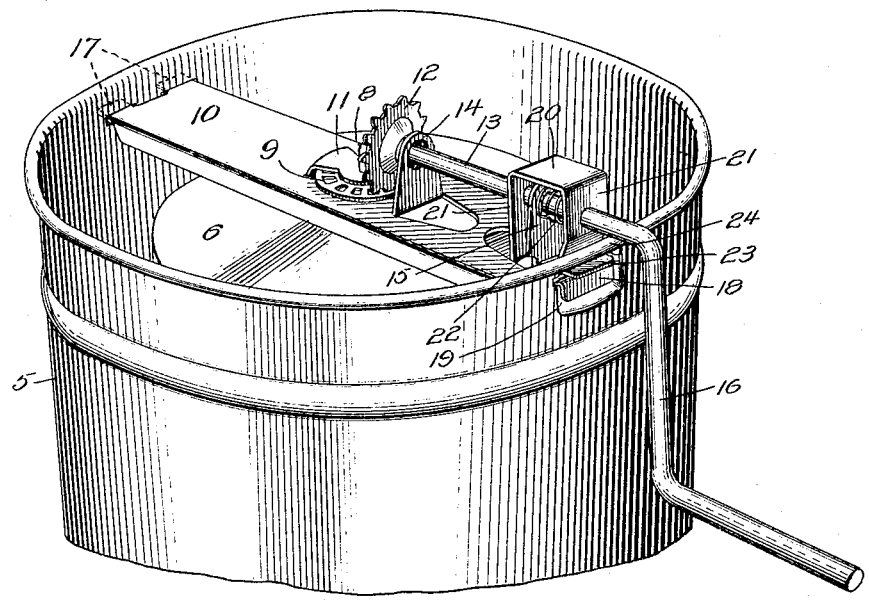
Fig. 1 is a perspective view of the top portion of an ice-cream-tub or can provided with my invention.
Figure 2:
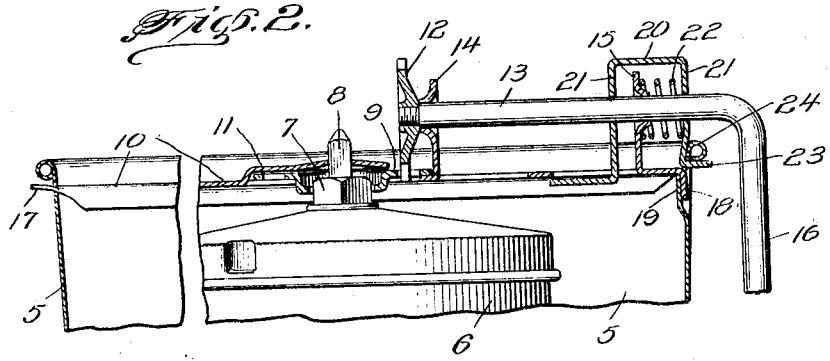
Fig. 2 is a vertical sectional view thereof.
Figure 3:
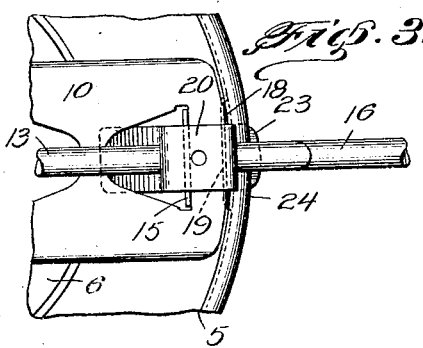
Fig. 3 is a plan view of one end of the gearing-bridge.
Figure 4:
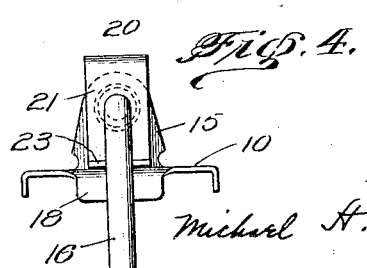
Fig. 4 is an end view of the gearing-bridge.

Referring to the drawing by reference characters, 5 designates a metal or other ice-bucket, 6 the usual cream can having a turning nut 7 affixed rigidly to its cover, up through which nut the upper squared end of the usual dasher-shaft 8 projects. Removably engaging the nut 7 is a gear 9 which rests on the bridge-plate 10 and is held in place by a top-plate 11 struck up from the bridge.

Meshing with the horizontal gear 9 is a vertical gear 12 affixed to a horizontal shaft 13 mounted in upstanding bearing brackets 14, 15 struck up from the bridge-plate 10, the outer end of said shaft being provided with the usual hand-crank 16. One end of the bridge-plate is provided with lugs 17 which pass through holes in the bucket near the rim thereof, and the other end of the bridge is provided with a down-turned lug 18 which is engaged over a lip 19 pressed in from the body of the bucket. In this way the bridge is rendered readily removable from the bucket, and to lock the bridge on the bucket I provide the following simple device:

Slidingly mounted on the shaft 13 is an inverted yoke which embodies a top-bar 20 and two depending leg members 21, these leg members being provided with coincident holes through which the shaft 13 freely passes. Between the outer one of the leg members 21 and the adjacent bridge-bracket 15 is mounted an expansible coiled spring 22 which normally tends to press the yoke outwardly toward the hand-crank. The lower end of the leg 21 is provided with an outwardly extending lip 23, which when the yoke is thus pressed normally outwardly, passes through a hole in the can body and engages under the usual rim bead 24, thus locking the bridge on the bucket. To release the lug, i. e., to disengage the lip 23 from the bead 24, it is simply necessary to press the yoke inwardly with the finger, thus compressing the spring 22 and moving the lip 23 inwardly far enough to pass out of the hole in the bucket, whereupon the lug carrying end of the bridge may be raised upwardly to release it from the bucket. When the bridge is restored to the bucket, it is simply necessary to compress the spring 22 by pushing inwardly on the leg 21 and then when the bridge is in place release the yoke and allow the spring 22 to snap the lip 23 into locking position under bead 24. The shaft 13 guides the locking yoke back and forth as is obvious, but to prevent the yoke from turning on the shaft I slidingly lock the inner one of the legs 21 to the bridge-plate 10 by extending the lower end of said leg down into a hole in the bridge-plate and bending it laterally so as to under-hang the edges of said hole, thus preventing the yoke being rocked to any appreciable extent independently of the bridge-plate, but at the same time leaving it free to slide back and forth on the shaft.

I claim:

In combination with a bucket having a lock-hole in its body near its rim, a gearing-bridge removably mounted on the bucket and carrying a pair of upstanding journal brackets, a horizontal shaft journalled in said brackets, a yoke-like locking device slidably mounted on said shaft and having one of its legs provided with an outwardly extending locking lip and the lower end of its other leg being provided with a member extending through a hole in the bridge and slidingly engaging the underside of the bridge for the purpose set forth, and a coiled expansible spring arranged within the yoke around the shaft to normally force the yoke into locking position.

In testimony whereof I hereunto affix my signature.

MICHAEL A. ROLLMAN.